United States Patent
Renn et al.

(10) Patent No.: US 10,737,561 B2
(45) Date of Patent: Aug. 11, 2020

(54) SUNROOF STRUCTURE

(71) Applicant: Nissan North America, Inc., Franklin, TN (US)

(72) Inventors: Jordan Renn, Royal Oak, MI (US); Jeffrey Pencak, Cass City, MI (US)

(73) Assignee: Nissan North America, Inc., Franklin, TN (US)

( * ) Notice: Subject to any disclaimer, the term of this patent is extended or adjusted under 35 U.S.C. 154(b) by 13 days.

(21) Appl. No.: 15/992,997

(22) Filed: May 30, 2018

(65) Prior Publication Data

US 2019/0366814 A1  Dec. 5, 2019

(51) Int. Cl.
  *B60J 7/04* (2006.01)
  *B60Q 3/20* (2017.01)
  *B60R 13/02* (2006.01)
  *B60J 7/00* (2006.01)
  *B60J 7/043* (2006.01)
  *B60J 1/20* (2006.01)
  *B60Q 3/208* (2017.01)

(52) U.S. Cl.
  CPC .......... *B60J 7/0015* (2013.01); *B60J 1/2013* (2013.01); *B60J 7/0435* (2013.01); *B60Q 3/20* (2017.02); *B60Q 3/208* (2017.02); *B60R 13/0231* (2013.01)

(58) Field of Classification Search
  CPC ........ B60J 7/0007; B60J 7/0015; B60J 7/043; B60J 7/0435; B60J 1/2013; B60Q 3/208; B60R 13/0231
  USPC ........................................................ 296/214
  See application file for complete search history.

(56) References Cited

U.S. PATENT DOCUMENTS

| | | | | |
|---|---|---|---|---|
| 5,599,059 A | * | 2/1997 | Shann | ...................... B60J 7/022 280/748 |
| 2011/0133522 A1 | * | 6/2011 | Kring | .................. B60R 13/0225 296/214 |
| 2012/0025567 A1 | * | 2/2012 | Suga | ................... B60R 13/0212 296/214 |
| 2012/0126583 A1 | * | 5/2012 | Brown | ................ B60R 13/0231 296/210 |
| 2014/0354017 A1 | * | 12/2014 | Nabuurs | .................... B60J 7/04 296/216.04 |
| 2016/0009165 A1 | * | 1/2016 | Sawada | .................. B60J 7/0015 296/98 |

(Continued)

FOREIGN PATENT DOCUMENTS

| | | |
|---|---|---|
| DE | 202008012356 U1 | 11/2008 |
| EP | 1559600 A2 | 8/2005 |

OTHER PUBLICATIONS

"Mini Cooper Logo Roof Decal Graphic Decals Works on Sunroof or painted" dated Apr. 2018, https://www.ebay.com/itm/Mini-Cooper-Logo-Roof-Decal-Graphic-Decals-Works-On-Sunroof-or-painted-/122153397053.

*Primary Examiner* — Gregory A Blankenship
(74) *Attorney, Agent, or Firm* — Global IP Counselors, LLP

(57) ABSTRACT

A sunroof structure includes a frame, a transparent material and a decorative panel. The frame is configured to install to a vehicle roof structure above a passenger compartment. The transparent material is installed to the frame such that light can pass therethrough to the passenger compartment. The decorative panel is installed to the frame such that at least a portion of the decorative panel covers an interior portion of the transparent material.

19 Claims, 8 Drawing Sheets

(56) References Cited

U.S. PATENT DOCUMENTS

| | | | |
|---|---|---|---|
| 2016/0121702 A1* | 5/2016 | Bojanowski | B62D 65/026 29/426.2 |
| 2016/0185194 A1* | 6/2016 | Rikkert | B60J 1/2052 160/368.1 |
| 2016/0229273 A1* | 8/2016 | Maeda | B60J 7/05 |
| 2017/0008383 A1* | 1/2017 | Ten-Jet-Foei | B60J 7/067 |
| 2017/0225551 A1* | 8/2017 | Serneels | B60J 7/022 |
| 2017/0291536 A1* | 10/2017 | Cannon | B60Q 3/208 |
| 2018/0105025 A1* | 4/2018 | Bott | B60J 7/0015 |
| 2018/0117995 A1* | 5/2018 | Hintennach | B60J 1/2041 |
| 2018/0257462 A1* | 9/2018 | Serebrennikov | B60J 7/0015 |
| 2018/0313124 A1* | 11/2018 | Park | E05D 15/101 |
| 2019/0160923 A1* | 5/2019 | Gardner | B60J 3/02 |
| 2019/0176595 A1* | 6/2019 | Foss | B60J 7/0015 |
| 2019/0210546 A1* | 7/2019 | Slovesko | B62D 25/06 |
| 2019/0225059 A1* | 7/2019 | Hiramatsu | B60J 1/2033 |

* cited by examiner

SUNROOF STRUCTURE

BACKGROUND

Field of the Invention

The present invention generally relates to a sunroof structure of a vehicle. More specifically, the present invention relates to a sunroof structure that includes a decorative panel that is secured to a frame of the sunroof structure providing an attractive appearance and added structural reinforcement to the sunroof structure.

Background Information

Many vehicles have sunroof structures.

SUMMARY

One object of the present disclosure is to provide a sunroof structure with a decorative panel that has an attractive appearance and can provide structural reinforcement and/or additional rigidity to the sunroof structure.

In view of the state of the known technology, one aspect of the present disclosure is to provide a sunroof structure with a frame, a transparent material and a decorative panel. The frame is configured to install to a vehicle roof structure above a passenger compartment. The transparent material is installed to the frame such that light can pass therethrough to the passenger compartment. The decorative panel is installed to the frame such that at least a portion of the decorative panel covers an interior portion of the transparent material.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
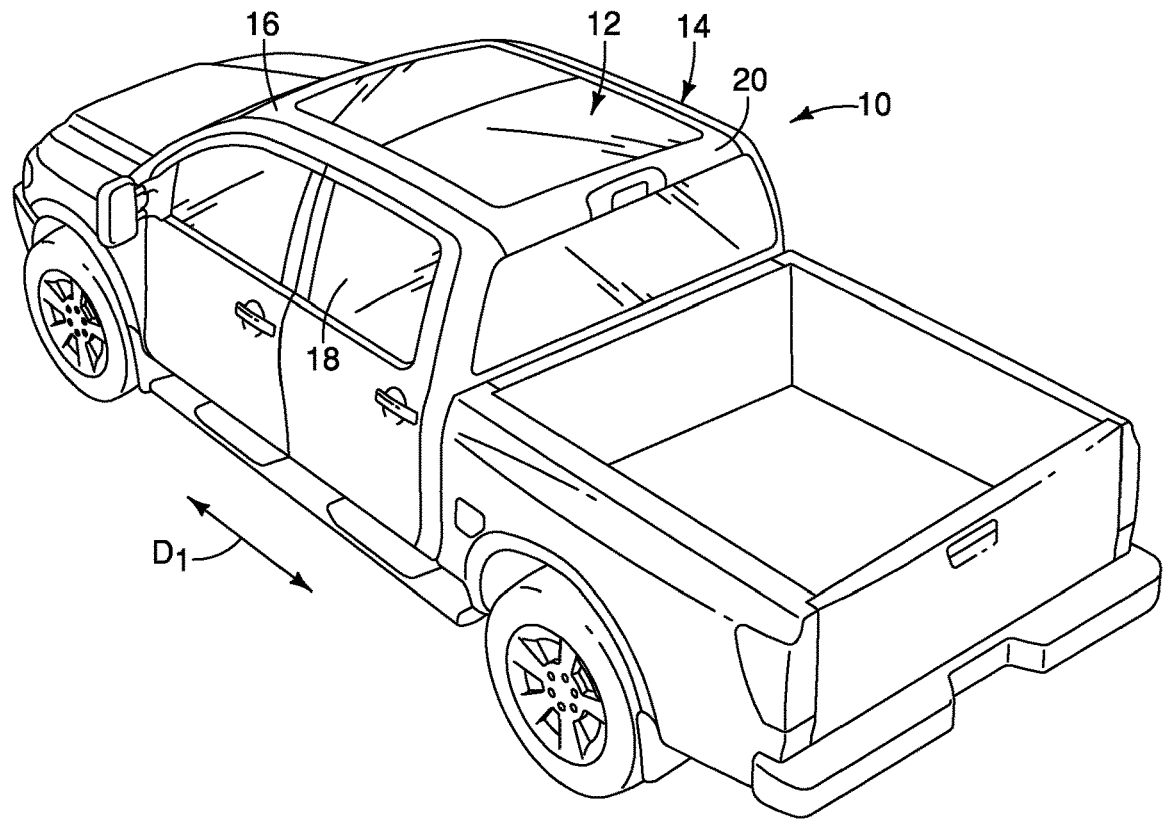
FIG. 1 is a perspective view of a vehicle showing a roof panel with a sunroof structure that includes a decorative panel in accordance with a first embodiment.

Referring initially to FIG. 1, a vehicle 10 having a sunroof structure 12 is illustrated in accordance with a first embodiment.

Figure 2:
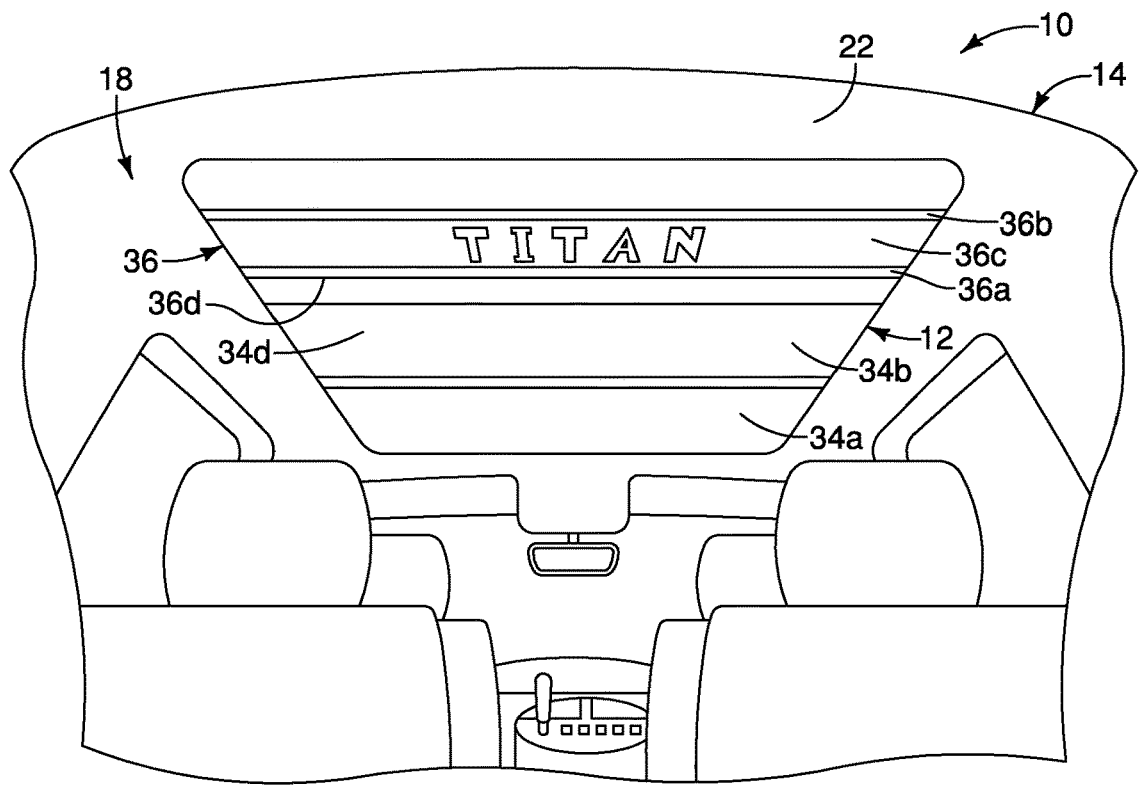
FIG. 2 is a perspective view of a passenger compartment of the vehicle depicted in FIG. 1, showing the sunroof structure and the decorative panel in accordance with the first embodiment.
Figure 3:
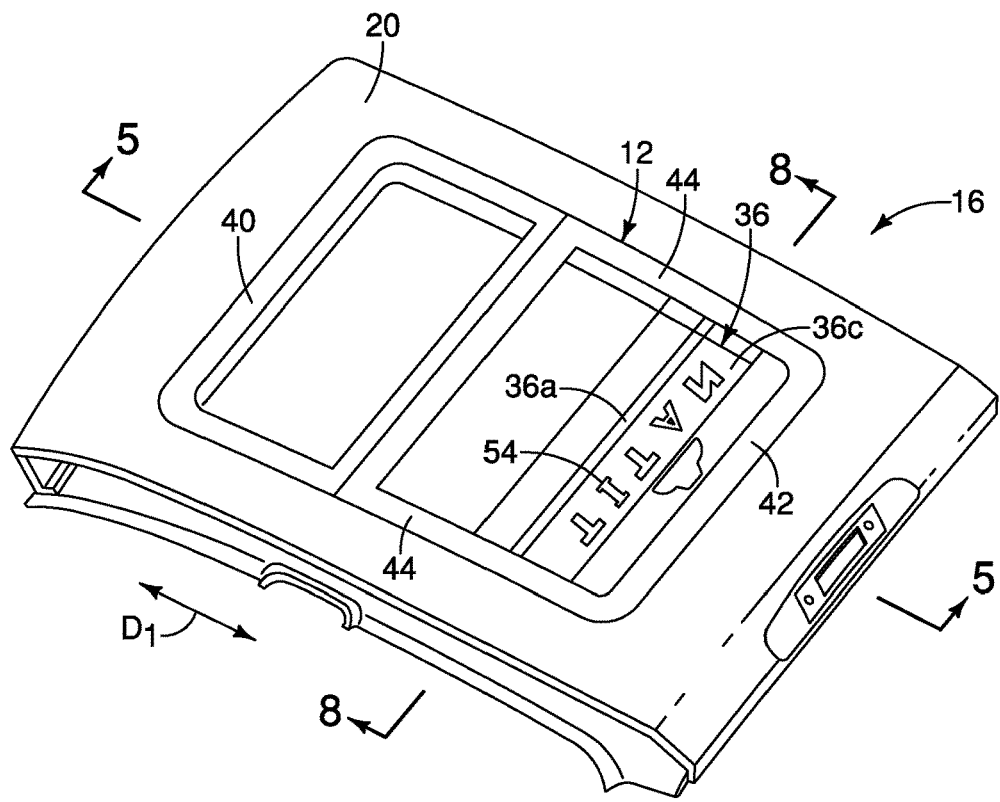
FIG. 3 is a perspective view of an exterior of the roof panel removed from the vehicle showing the sunroof structure and the decorative panel in accordance with the first embodiment.

In the depicted embodiment, the vehicle 10 is a pickup truck. However, it should be understood from the drawings and the description herein that the vehicle 10 can alternatively be any of a variety of vehicle designs, such as a coupe, a sedan, a van or mini-fan, or an SUV (sports utility vehicle). The vehicle 10 includes, among other features and components, a vehicle body structure 14 that includes a roof structure 16 and defines a passenger compartment 18. The exterior of the roof structure 16 is defined by at least one roof panel 20 (FIGS. 1 and 3). An interior of the roof structure 16 is at least partially covered by a headliner 22 (FIG. 2).

Figure 4:
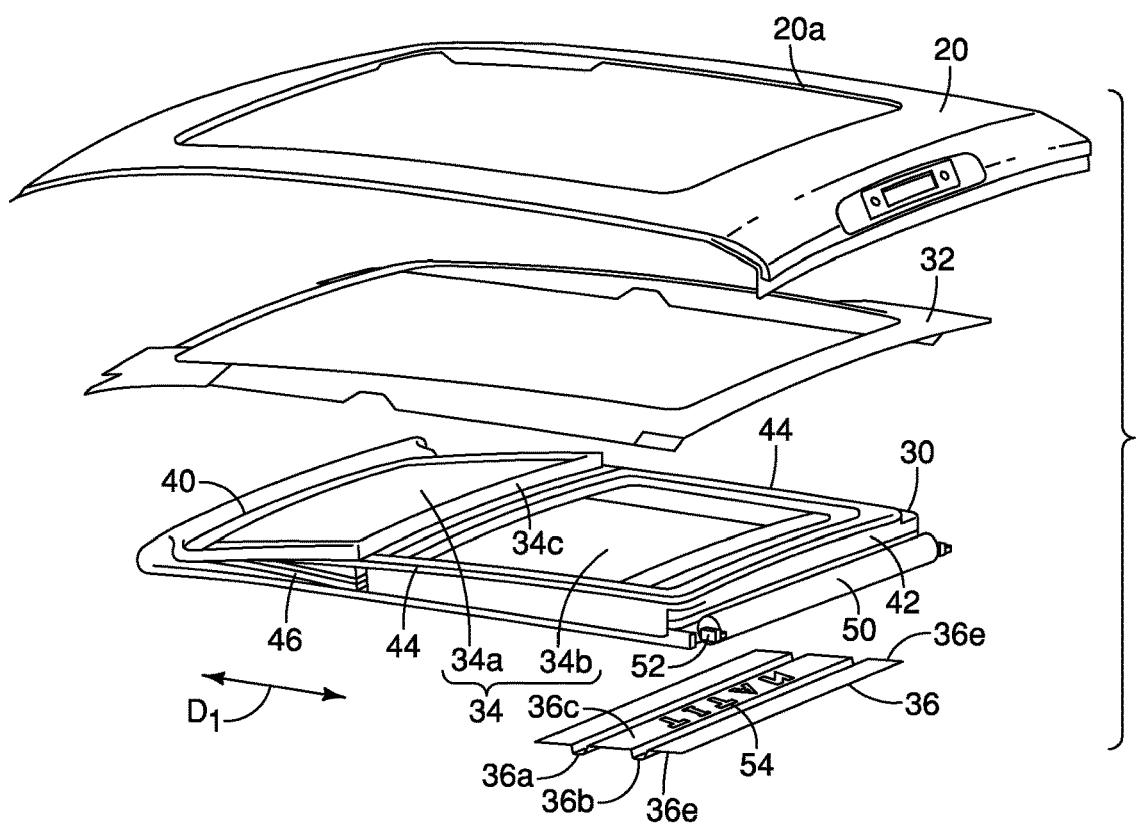
FIG. 4 is an exploded perspective view of the roof panel and the sunroof structure showing a support member, frame and the decorative panel of the sunroof structure in accordance with the first embodiment.

The roof structure 16 of the vehicle 10 has an opening 20a (FIG. 4). Similarly, the headliner 22 includes another opening that aligns with the opening 20a. The sunroof structure 12 is installed to the roof structure 14 and extends at least part way through the opening 20a of the roof structure 14 of the vehicle 10.

With initial reference to FIGS. 2-9, a description of the sunroof structure 12 is now provided. The sunroof structure 12 basically includes a frame 30, a support member 32, transparent material 34 and the decorative panel 36.

As shown in FIG. 4, the frame 30 has an overall rectangular shape and is configured to install to the vehicle roof structure 16 (via the support member 32) above a passenger compartment 18. The frame 30 is dimensioned to align with the opening 20a in the roof structure 16. The frame 30 includes a front portion 40, a rear portion 42 and side rails 44. The side rails 44 extend in a vehicle longitudinal direction $D_1$ along opposite sides of the frame 30 from the front portion 40 to the rear portion 42.

The transparent material 34 includes the front section 34a and a rear section 34b. The front section 34a is installed to the front portion 40 of the frame 30, and, the rear section 34b is installed to the rear portion of the frame 30. The front section 34a is preferably located above a set of front seats within the passenger compartment 18 and the rear section 34b is preferably located above a set of rear seats within the passenger compartment 18 allowing light to pass therethrough.

The front portion 30 of the frame 30 includes a mechanical movement device 46 that is configured to slide the front section 34a of the transparent material 34 between a closed position shown in FIGS. 1, 2 and 3, and an open position (not shown). The mechanical movement device 46 of the frame 30 is further configured to tilt a rearward edge 34c of the front section 34a of the transparent material 34 between a level position (FIGS. 1, 2 and 3) and a tilted open position (FIG. 4). Since mechanical movement devices of sunroof structures are conventional mechanisms, further description is omitted for the sake of brevity. The rear section 34b of the transparent material 34 is fixedly attached to the frame 30 and is not moveable relative to the frame 30.

Alternatively, the front portion 40 (and front section 34a) can be fixed to the frame 30 or part of the frame 30 in the absence of the mechanical movement device 46. Still further, in the absence of the mechanical movement device 46, the transparent material 34 can be a single element, with the front section 34a and the rear section 34b being differing areas of a single transparent sheet or member.

Figure 5:
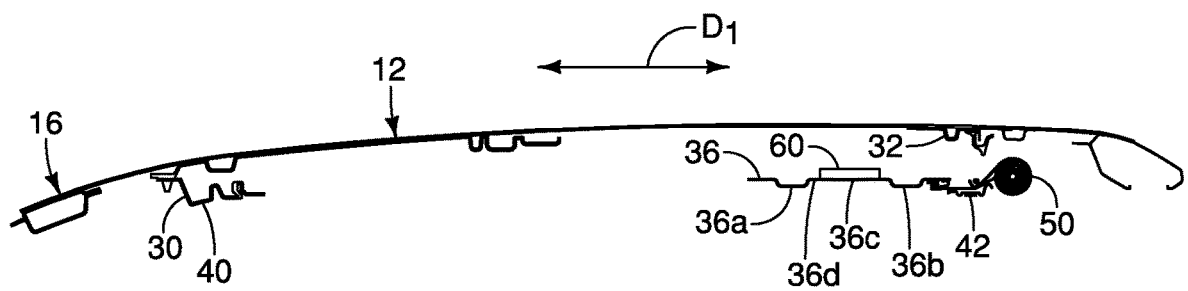
FIG. 5 is a side cross-sectional schematic view of the roof panel and the sunroof structure taken along the line 5-5 in FIG. 3, showing a rolling shade in a retracted or open orientation in accordance with the first embodiment.
Figure 6:
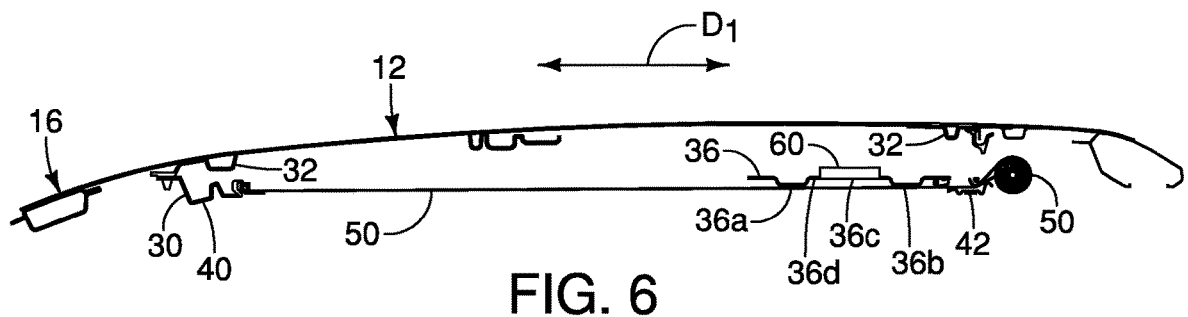
FIG. 6 is another side cross-sectional schematic view of the roof panel and sunroof structure showing the rolling shade in a closed orientation in accordance with the first embodiment.
Figure 7:
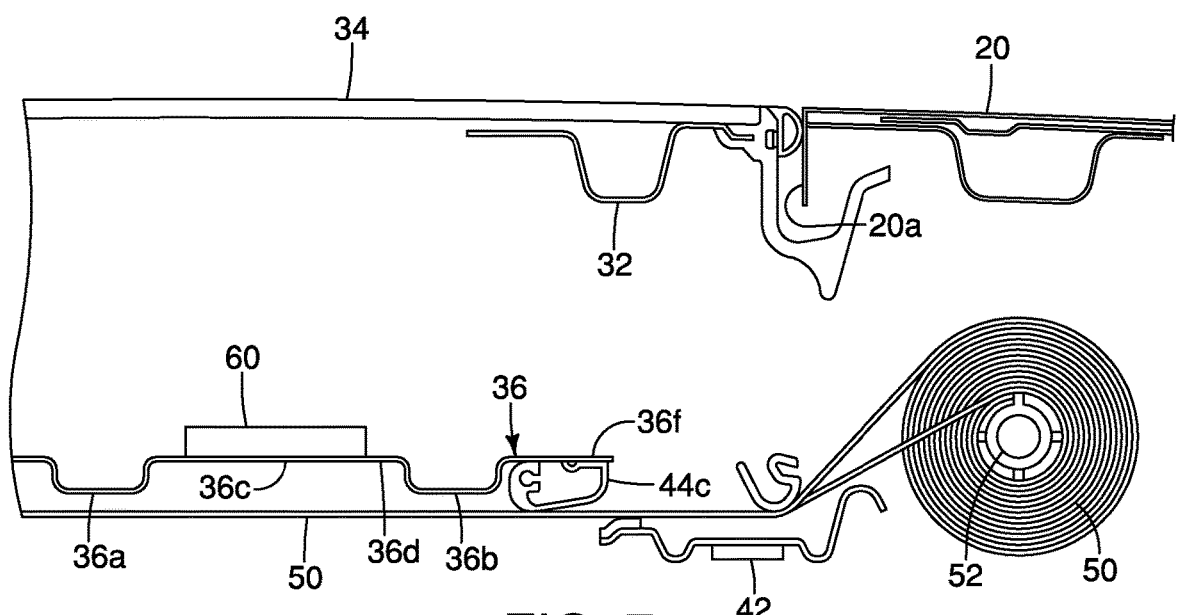
FIG. 7 is another side cross-sectional schematic view of a rearward area of the roof panel and the sunroof structure showing the rolling shade and a retracting mechanism 52 in accordance with the first embodiment.
Figure 8:
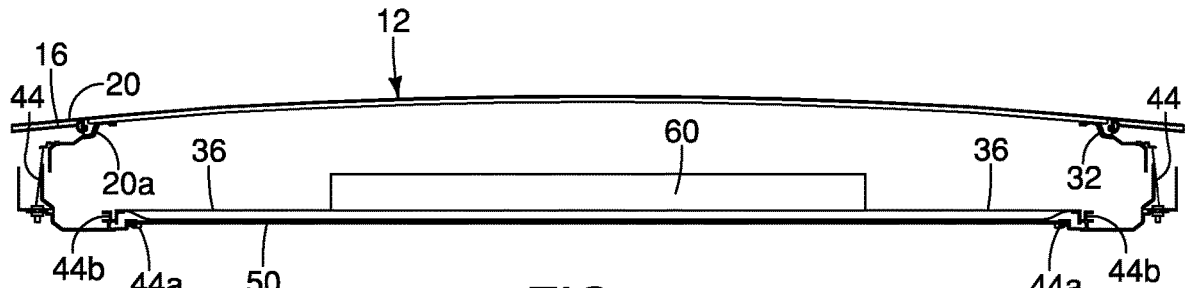
FIG. 8 is a cross-section of the roof panel and sunroof structure taken along the line 8-8 in FIG. 3 in accordance with the first embodiment.

As shown in FIGS. 4-7, the frame 30 includes a rolling shade 50 movable between an open orientation shown in FIG. 5 and a closed orientation shown in FIG. 6. In the closed orientation, the rolling shade 50 covers a lower surface 34d of the transparent material 34 and a lower surface 36d of the decorative panel 36 relative to and/or visible from within the passenger compartment 18. In the open orientation, the rolling shade 50 exposes the lower surface 34d of the transparent material 34 and the lower surface 36d of the decorative panel 36 relative to the passenger compartment 18. As shown in FIG. 7, the rolling shade 50 can be spooled onto a retracting mechanism 52 and spooled off of the retracting mechanism 52. The retracting mechanism 52 can be a spring-loaded mechanism and the rolling shade 50 can be manually moved by the vehicle operator between the open orientation and the closed orientation. Alternatively, the retracting mechanism 52 can be part of an automatic retracting system (not shown) where electric motors (not shown) operated by the vehicle operator open and close the rolling shade 50 covering and concealing the underside of the sunroof structure 12. As shown in FIG. 8, opposite lateral sides of the rolling shade 50 extend into guide tracks 44a that are supported by and/or part of the side rail portions 44 of the frame 30.

The support member 32 is a rectangular shaped ring that attaches to an underside of the roof panel 20 within the passenger compartment 18 via, for example, welding techniques or mechanical fasteners (not shown). The frame 30 of the sunroof structure 12 further attaches to the support member 32 via mechanical fasteners (not shown) in a conventional manner.

The transparent material 34 installed to the frame 30 such that light can pass therethrough to the passenger compartment 18. The transparent material 34 can be a glass material manufactured for use in automotive applications, such as a layered glass material, or a layered plexiglass material, that include anti-shattering layers or other materials appropriate for automotive vehicle usage.

Figure 9:
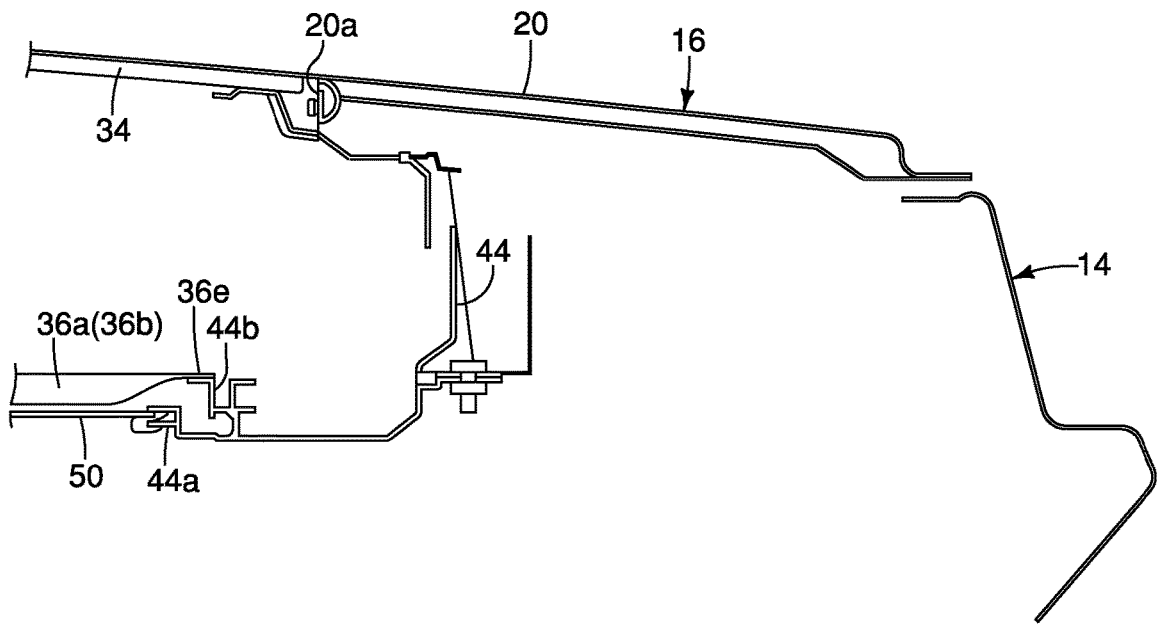
FIG. 9 is another cross-section of the roof panel and sunroof structure similar to FIG. 8, showing only one lateral side of the sunroof structure in accordance with the first embodiment.
Figure 10:
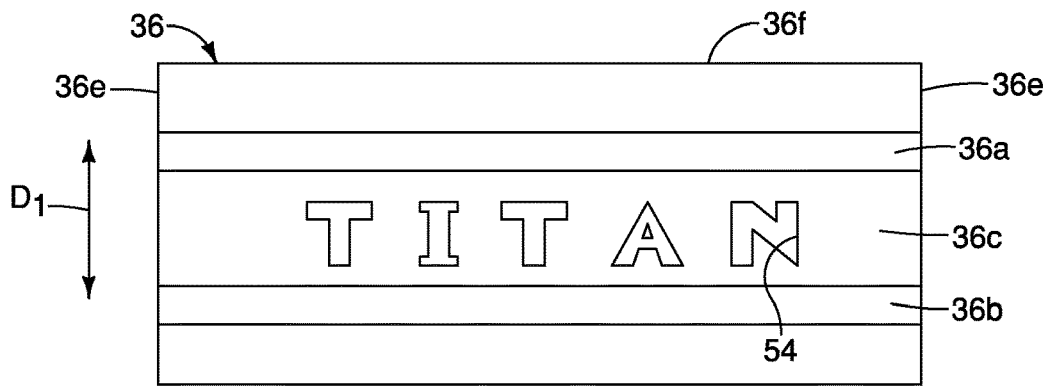
FIG. 10 is a plan view of a lower surface the decorative panel shown removed from the sunroof structure in accordance with the first embodiment.

In the depicted embodiment as shown in FIGS. 4 and 10, the decorative panel 36 is made of a sheet metal material that has been subjected to pressing or other deforming processes to include a first rib 36a (a front rib), a second rib 36b (a rear rib) and a central area 36c located between the first rib 36a and the second rib 36b. Lateral edges 36e of the decorative panel 36 are shaped to contact and be fixedly attached to support flanges 44b above the guide tracks 44a, as shown in FIGS. 8 and 9. The support flanges 44b are supported by and/or part of the side rail portions 44 of the frame 30. A rear end 36f of the decorative panel 36 can be fixedly attached to a flange 44c of the frame 30, as shown in FIG. 7. The decorative panel 36 can be welded to the support flanges 44b and 44c or can be attached via mechanical fasteners (not shown).

It should be understood from the drawings and the description herein, that the decorative panel 36 can be a separate element added to any of a variety of sunroof structures and frames. It should further be understood that the decorative panel 36 can alternatively be an integral part of the frame 30. Specifically, the decorative panel 36 can be manufactured with the frame 30 as an integral structural portion of the frame 30.

The decorative panel 36 is installed to the frame 30 such that at least a portion of the decorative panel 36 covers the lower surface 34d (an interior portion) of the transparent material 34. In the first embodiment, the decorative panel 36 covers a rearward part of the rear section 34b of the transparent material 34.

As shown in FIGS. 1-4, the central area 36c of the decorative panel 36 includes a decorative cutout 54 such that light can pass therethrough to the passenger compartment 18. The decorative cutout 54 is an area or areas where predetermined portions of the central area 36c of the decorative panel 36 have been removed creating a opening or a series of openings that can be in the form of a decorative pattern, or text. In the depicted embodiment, the decorative cutout 54 is in the form of letters or text that spell out a word or name. Alternatively, the decorative cutout 54 can be in the form of a decorative pattern, such as a flower, bird, or a series of parallel cutout lines that resemble a vent or front grill of an automobile. In other words, the decorative cutout 54 can have any of a variety of designs that allows light to shine therethrough from the transparent material 34. In the first embodiment, the decorative cutout 54 is located between the front rib 36a and the rear rib 36b. However, it should be understood from the drawings and the description herein that the decorative cutout 54 can be defined anywhere on the decorative panel 36.

The sunroof structure 12 can include an optional electrically powered light source 60 installed along an upper surface of the decorative panel 36, as shown in FIGS. 5-8. The electrically powered light source 60 is installed above the central area 36c of the decorative panel 36 such that light from the electrically powered light source 60 shines through the decorative cutout(s) 54. Further, the electrically powered light source 60 can be positioned directly over the decorative cutout 54, if desired. The electrically powered light source 60 is fixed to the decorative panel 36 via mechanical fasteners (not shown), adhesive material, or welding techniques. The electrically powered light source 60 can be monochromatic, or, can provide a plurality of differing colors for illumination of the decorative cutout(s) 54.

When the electrically powered light source 60 is omitted and the rolling shade 50 is open, sunlight or light from streetlight can shine through the decorative cutouts 54. With the electrically powered light source 60 installed to the decorative panel 36, light can be selectively provided from the electrically powered light source 60, depending on whether or not the vehicle operator or a passenger turns on the electrically powered light source 60. Specifically, the electrically powered light source 60 can be electrically connected to a switch (not shown) installed to an instrument panel, center console, or wall of the vehicle 10 within the passenger compartment 18 for the convenience of the vehicle operator or passenger. The switch moves between a light on position and a light off position thereby providing a mechanism for controlling operation of the electrically powered light source 60.

The decorative panel 36 can be designed and shaped in any of a variety of decorative ways and is not limited to the overall rectangular shape shown in FIGS. 1-10. The shape of the decorative panel 36 as shown in FIGS. 1-10 provides a structural benefit in that the decorative panel 36 can add rigidity to the frame 30 of the sunroof structure 12.

Second Embodiment

Figure 11:
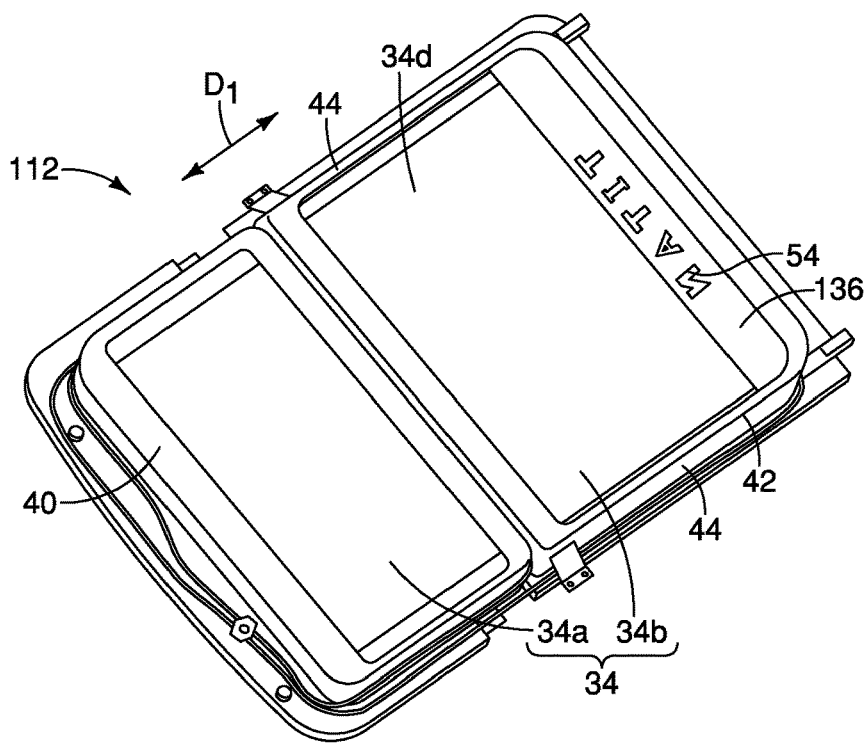
FIG. 11 is a perspective view of a lower side of the sunroof structure showing a decorative panel in accordance with a second embodiment.

Referring now to FIG. 11, a decorative panel 136 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the decorative panel 136 is installed to a sunroof structure 112 that is identical to the sunroof structure 12 of the first embodiment, except that the sunroof structure 112 includes the decorative panel 136. Therefore, description of the sunroof structure 112 is omitted for the sake of brevity, since it is identical to that of the first embodiment, except for the differences between the decorative panel 136 and the decorative panel 36 of the first embodiment.

The decorative panel 136 of the second embodiment is smaller than the decorative panel 36, and, is a flat sheet metal element without ribs. Specifically, the decorative panel 136 is less than half the overall length of the decorative panel 36 of the first embodiment as measured in the vehicle longitudinal direction $D_1$. The decorative panel 136 includes the decorative cutout(s) 54 as in the first embodiment. Although not shown, the decorative panel 136 can optionally include the electrically powered light source 60.

Third Embodiment

Figure 12:
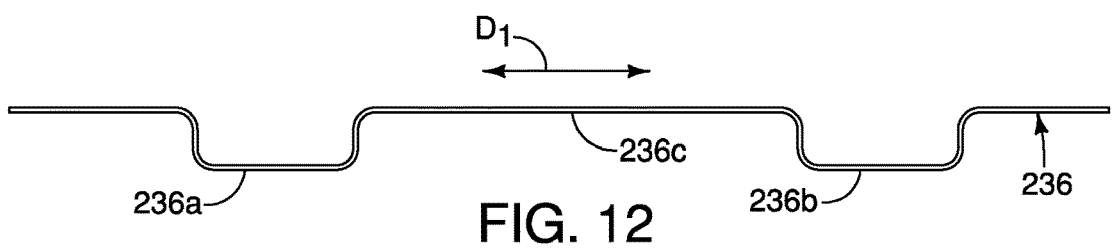
FIG. 12 is a side view of a decorative panel removed from the sunroof structure in accordance with a third embodiment.

Referring now to FIG. 12, a decorative panel 236 in accordance with a third embodiment will now be explained.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the decorative panel 236 includes elongated ribs 236a and 236b and a central area 236c (decorative area) that have relative dimensions that differ from that of the decorative panel 36 of the first embodiment. As measured in the vehicle longitudinal direction $D_1$, the ribs 236a and 236b can be longer or shorter than that of the ribs 36a and 36b of the first embodiment relative to the length of the central area 36c of the first embodiment. In the third embodiment, the ribs 236a and 236b have an overall rectangular appearance as viewed from a lateral side thereof in FIG. 12.

Fourth Embodiment

Figure 13:
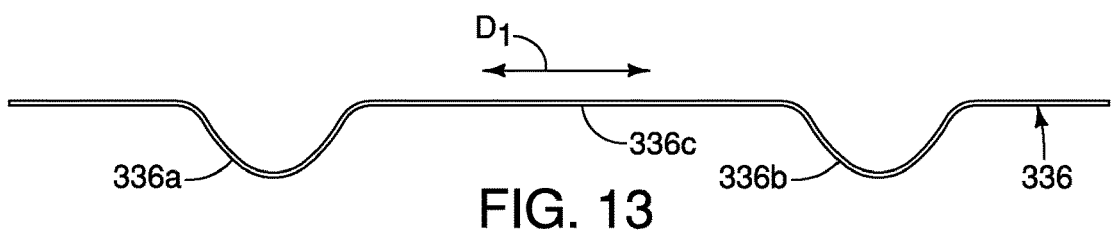
FIG. 13 is a side view of a decorative panel removed from the sunroof structure in accordance with a fourth embodiment.

Referring now to FIG. 13, a decorative panel 336 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the decorative panel 336 includes elongated ribs 336a and 336b and a central area 336c (decorative area) that have differing shapes relative to those of the decorative panel 36 of the first embodiment. Specifically, in the fourth embodiment, the ribs 336a and 336b have an overall semicircular or rounded appearance as viewed from a lateral side thereof in FIG. 13.

Fifth Embodiment

Figure 14:
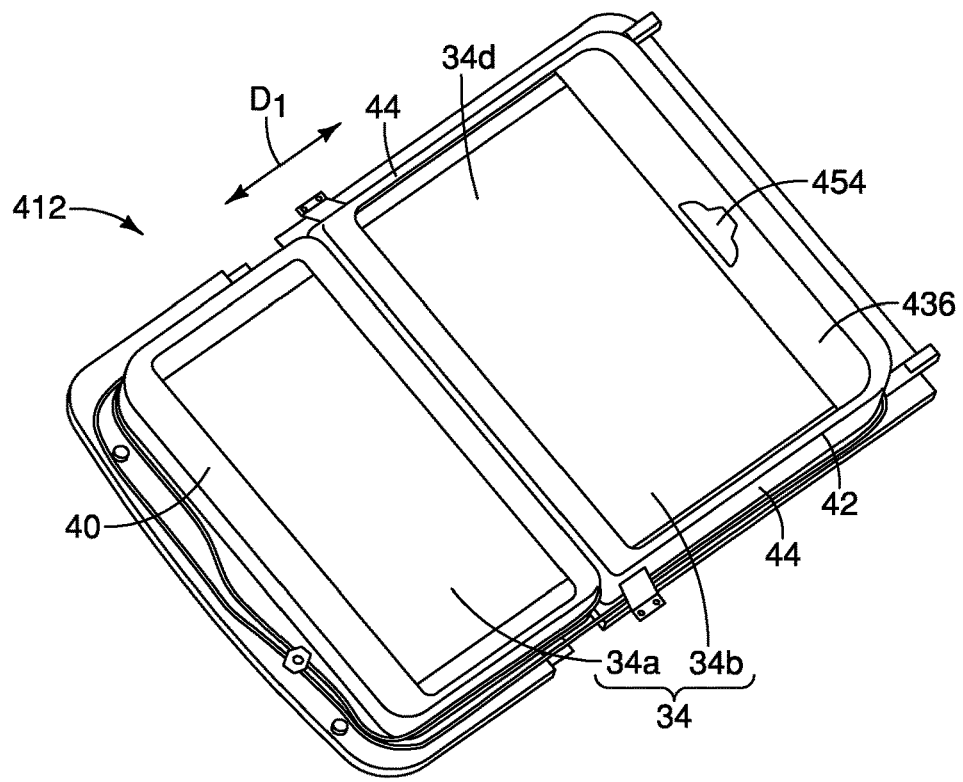
FIG. 14 is a perspective view of a lower side of the sunroof structure showing a decorative panel in accordance with a fifth embodiment.

Referring now to FIG. 14, a sunroof structure 412 with a decorative panel 436 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the decorative panel 436 is installed to a sunroof structure 412 that is identical to the sunroof structure 12 of the first embodiment, except that the sunroof structure 412 includes the decorative panel 436. Therefore, description of the sunroof structure 412 is omitted for the sake of brevity, since it is identical to that of the first embodiment, except for the differences between the decorative panel 436 and the decorative panel 36 of the first embodiment.

The decorative panel 436 of the fifth embodiment is smaller than the decorative panel 36, and, is a flat sheet metal element without ribs. Specifically, the decorative panel 436 is less than half the overall length of the decorative panel 36 of the first embodiment as measured in the vehicle longitudinal direction $D_1$. The decorative panel 436 includes a decorative cutout 454 that does not include text or letters, but rather includes a decorative shape, as shown in FIG. 14. Although not shown, the decorative panel 436 can optionally include the electrically powered light source 60.

Sixth Embodiment

Figure 15:
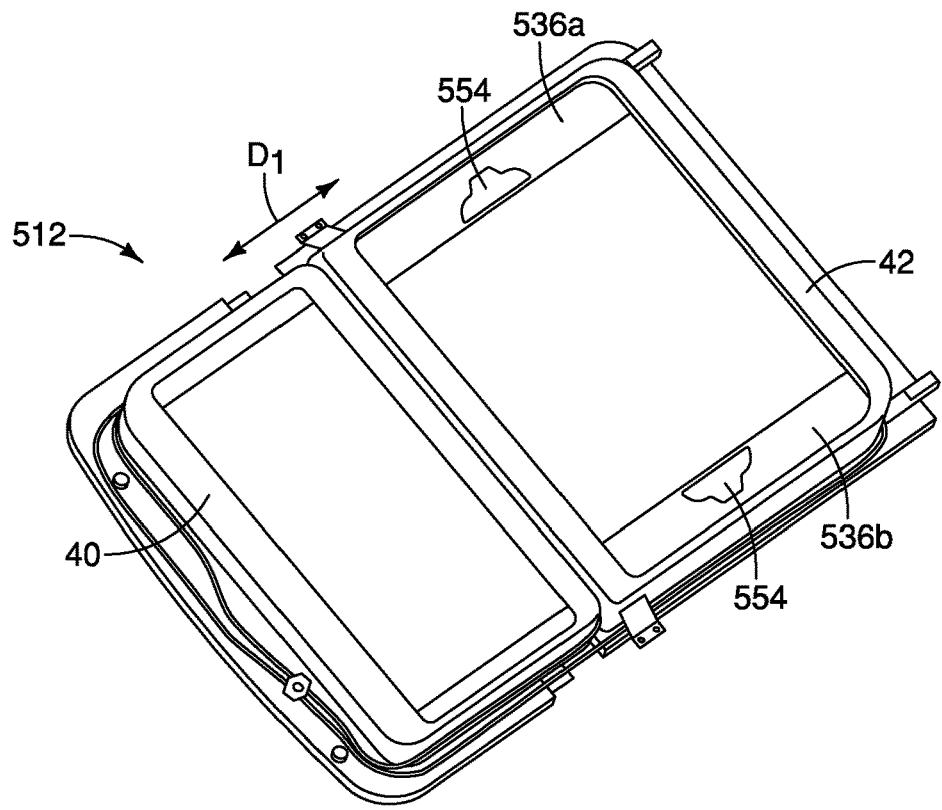
FIG. 15 is a perspective view of a lower side of the sunroof structure showing a decorative panel in accordance with a sixth embodiment.

Referring now to FIG. 15, a sunroof structure 512 with two decorative panels 536a and 536b in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the decorative panels 536a and 536b is installed to a sunroof structure 512 that is identical to the sunroof structure 12 of the first embodiment, except that the sunroof structure 512 includes the decorative panels 536a and 536b. Therefore, description of the sunroof structure 512 is omitted for the sake of brevity, since it is identical to that of the first embodiment, except for the differences between the decorative panels 536a and 536b and the decorative panel 36 of the first embodiment.

The decorative panels 536a and 536b of the sixth embodiment are installed to opposite lateral sides of the sunroof structure 12. Each of the decorative panels 536a and 536b includes a decorative cutout 554. Each of the decorative panels 536a and 536b can optionally include one of a pair of electrically powered light sources 60 (not shown).

Seventh Embodiment

Figure 16:
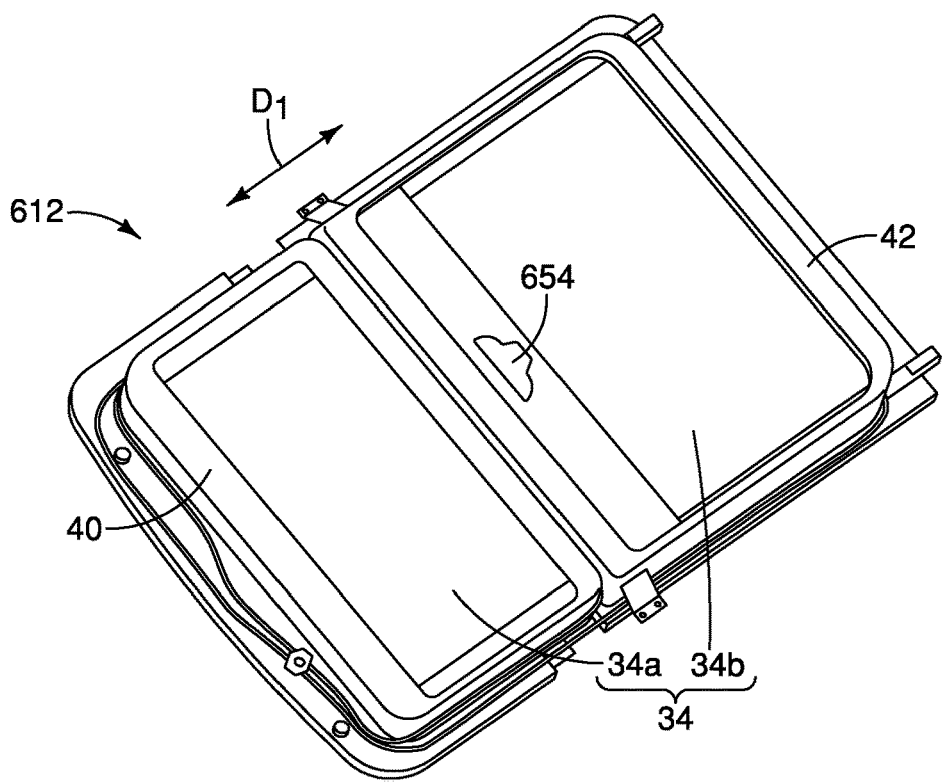
FIG. 16 is a perspective view of a lower side of the sunroof structure showing a decorative panel in accordance with a seventh embodiment.

Referring now to FIG. 16, a sunroof structure 612 with a decorative panel 636 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the decorative panel 636 is installed to a sunroof structure 612 that is identical to the sunroof structure 12 of the first embodiment, except that the sunroof structure 612 includes the decorative panel 636. Therefore, description of the sunroof structure 612 is omitted for the sake of brevity, since it is identical to that of the first embodiment, except for the differences between the decorative panel 636 and the decorative panel 36 of the first embodiment.

The decorative panel 636 of the seventh embodiment is installed to a forward area of the rear section 34b (corresponding to a forward area of the rear portion 42 of the frame 30) of the sunroof structure 612. The decorative panel 636 includes a decorative cutout 654. The decorative panel 636 can optionally include one of a pair of electrically powered light sources 60 (not shown).

Eighth Embodiment

Figure 17:
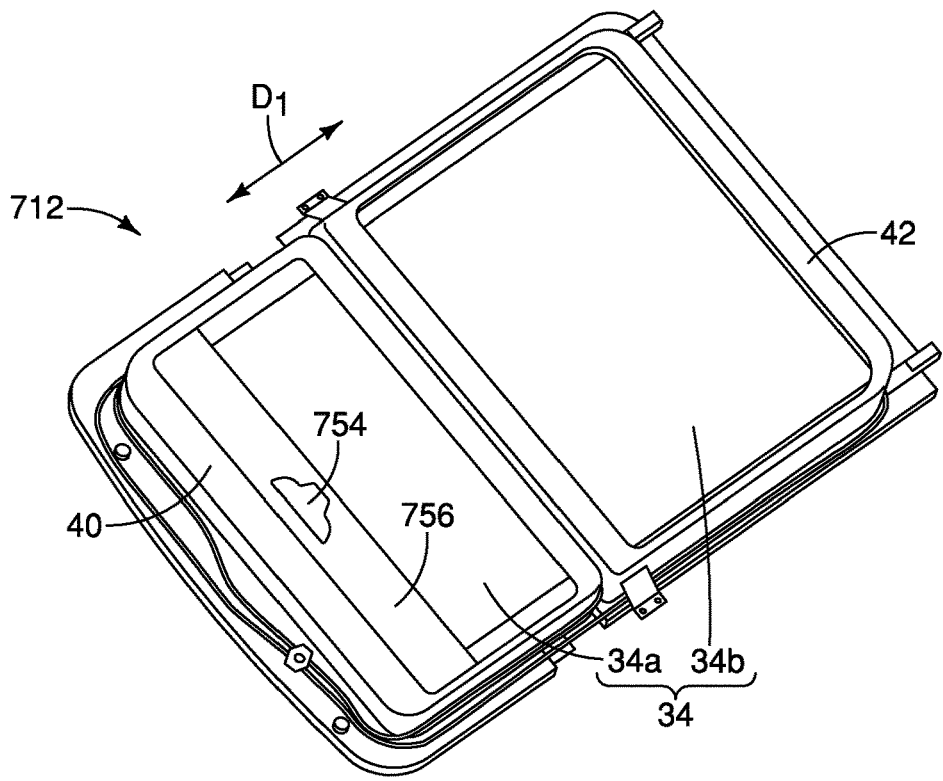
FIG. 17 is a perspective view of a lower side of the sunroof structure showing a decorative panel in accordance with an eighth embodiment.

Referring now to FIG. 17, a sunroof structure 712 with a decorative panel 736 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the decorative panel 736 is installed to the sunroof structure 712 that is identical to the sunroof structure 12 of the first embodiment, except that the sunroof structure 712 includes the decorative panel 736. Therefore, description of the sunroof structure 712 is omitted for the sake of brevity, since it is identical to that of the first embodiment, except for the differences between the decorative panel 736 and the decorative panel 36 of the first embodiment.

The decorative panel 736 of the eighth embodiment is installed to a forward area of the front section 34a (corresponding to a forward area of the front portion 40 of the frame 30) of the sunroof structure 712. The decorative panel 736 includes a decorative cutout 754. The decorative panel 736 can optionally include the electrically powered light sources 60 (not shown).

Ninth Embodiment

Figure 18:
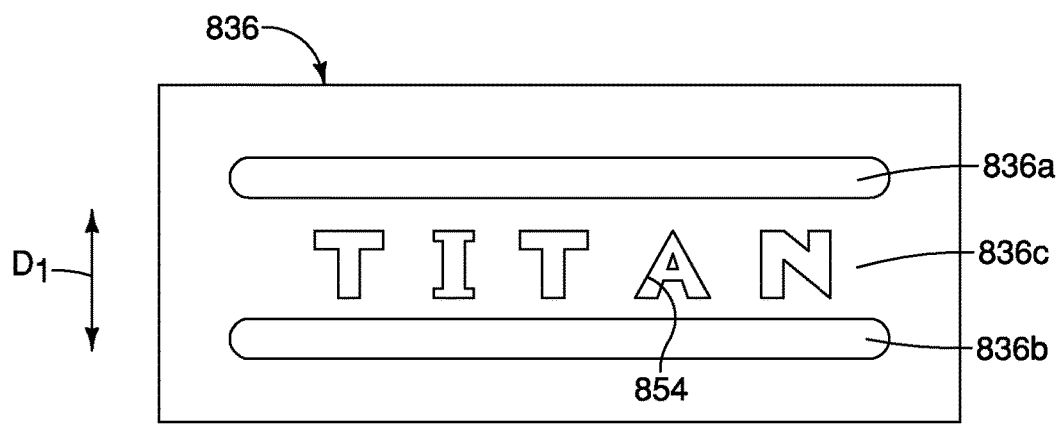
FIG. 18 is a plan view of a lower surface a decorative panel shown removed from the sunroof structure in accordance with a ninth embodiment.

Referring now to FIG. 18, a decorative panel 836 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

In the ninth embodiment, the decorative panel 836 includes a first rib 836a, a second rib 836b and a central area 836c that includes a decorative cutout(s) 854. The first and second ribs 836a and 836b do not extend the entire width (the width being measured perpendicular to the vehicle longitudinal direction $D_1$) of the decorative panel 836. Hence, the lateral edges of the decorative panel 836 are completely flat and are easily attached to the frame 30 of the sunroof structure 12.

Tenth Embodiment

Figure 19:
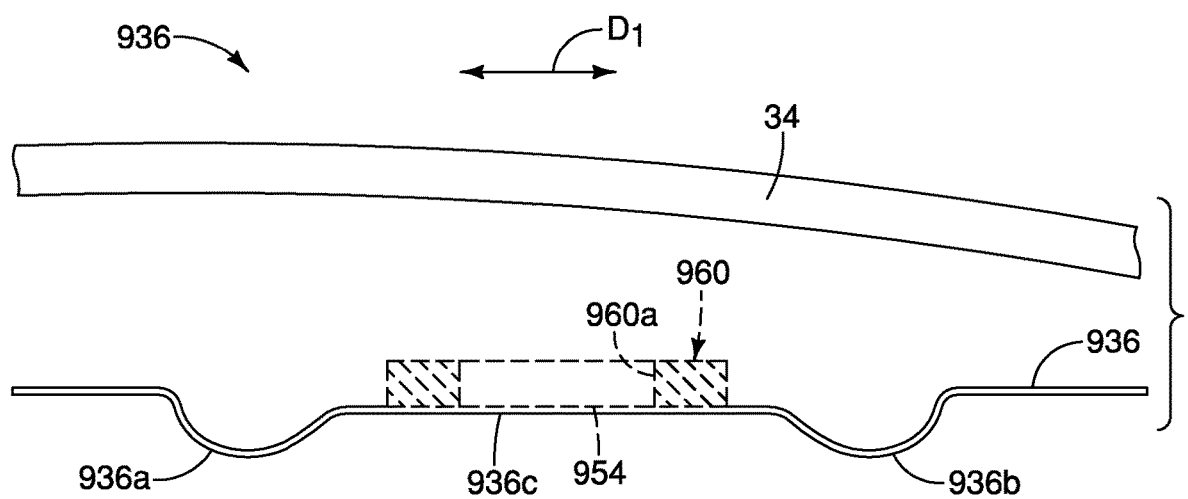
FIG. 19 is a cross-sectional view of a rearward portion of the sunroof structure shown a decorative panel and electrically powered light source in accordance with a tenth embodiment.

Referring now to FIG. 19, a decorative panel 936 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

In the tenth embodiment, the decorative panel 936 is installed to a sunroof structure that is identical to the sunroof structure 12 of the first embodiment. Therefore, description of the sunroof structure is omitted for the sake of brevity, since it is identical to that of the first embodiment, except for the differences between the decorative panel 936 and the decorative panel 36 of the first embodiment.

The decorative panel 936 of the tenth embodiment is similar to the decorative panels 336 of the fourth embodiment and includes a first rib 936a, a second rib 936b and a central area 936c. The central area 936c includes a decorative cutout 954 and an electrically powered light source 960. The electrically powered light source 960 is dimensioned and shaped such that the electrically powered light source 60 surrounds the decorative cutout 954. Consequently, sunlight shining through the transparent material 34 can further shine through the decorative cutout 954. Additionally, when the electrically powered light source 960 is turned on, light from the electrically powered light source 960 can illuminate the decorative cutout 954.

The various elements and features of the vehicle 10, other than the decorative panels described above, are conventional components that are well known in the art. Since such vehicle elements and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the sunroof structure. Accordingly, these terms, as utilized to describe the present invention should be interpreted relative to a vehicle equipped with the sunroof structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A sunroof structure comprising:
a frame configured to install to a vehicle roof structure above a passenger compartment, the frame having a first side rail portion and a second side rail portion that define opposites sides of the frame;
transparent material installed to the frame such that light can pass therethrough to the passenger compartment; and
a decorative panel having a first end and a second end, the first end being installed to the first side rail portion and the second end being installed to the second side rail portion of the frame, the decorative panel extending from the first side rail portion to the second side rail portion covering an interior portion of the transparent material that extends between the first side rail portion and the second side rail portion, the decorative panel being made of a rigid metallic material.

2. The sunroof structure according to claim 1, wherein the decorative panel includes a decorative cutout such that light can pass therethrough to the passenger compartment.

3. The sunroof structure according to claim 2, wherein the decorative cutout defines a decorative pattern.

4. The sunroof structure according to claim 2, wherein the decorative cutout defines text.

5. The sunroof structure according to claim 2, wherein the decorative panel includes a pair of ribs that extends from a first lateral side of the decorative panel to a second lateral side of the decorative panel, with the decorative cutout being defined between the pair of ribs.

6. The sunroof structure according to claim 2, wherein the decorative panel includes an electrically powered light source installed above the decorative panel such that light from the electrically powered light source shines through the decorative cutout.

7. The sunroof structure according to claim 2, wherein the decorative panel includes an electrically powered light source installed above the decorative panel the electrically powered light source surrounds the decorative cutout.

8. The sunroof structure according to claim 1, wherein the decorative panel includes at least one rib that extends from a first lateral side of the decorative panel to a second lateral side of the decorative panel.

9. The sunroof structure according to claim 1, wherein the transparent material is a glass material.

10. The sunroof structure according to claim 1, wherein the frame includes a front portion and a rear portion, and the transparent material includes the front section and a rear section, the front section being installed to the front portion of the frame and the rear section being installed to the rear portion of the frame.

11. The sunroof structure according to claim 10, wherein the decorative panel is installed to the front portion of the frame beneath the front section of the transparent material.

12. The sunroof structure according to claim 10, wherein the decorative panel is installed to the rear portion of the frame beneath the rear section of the transparent material.

13. The sunroof structure according to claim 10, wherein the front portion of the frame includes a mechanical movement device configured to move the front section of the transparent material between a closed position and an open position.

14. The sunroof structure according to claim 13, wherein the mechanical movement device of the frame is further configured to tilt a rearward edge of the front section of the transparent material between a level position and a tilted open position.

15. A sunroof structure according, comprising:
a frame configured to install to a vehicle roof structure above a passenger compartment;
transparent material installed to the frame such that light can pass therethrough to the passenger compartment; and
a decorative panel installed to the frame such that at least a portion of the decorative panel covers an interior portion of the transparent material,
the frame includes a rolling shade movable between a closed orientation and an open orientation, such that in the closed orientation the rolling shade covers a lower surface of the transparent material and the decorative panel relative to the passenger compartment, and in the open orientation the rolling shade exposes the lower surface of the transparent material and the decorative panel relative to the passenger compartment.

16. A sunroof structure comprising:
a frame configured to install to a vehicle roof structure above a passenger compartment;
transparent material installed within the frame such that light can pass therethrough to the passenger compartment; and
a decorative panel made of a rigid metallic material and installed to the frame such that at least a portion of the decorative panel extends under and covers an interior portion of the transparent material.

17. The sunroof structure according to claim 16, wherein the decorative panel extends between opposite sides of the frame.

18. The sunroof structure according to claim 16, wherein the decorative panel includes at least one rib that extends from a first lateral side of the decorative panel to a second lateral side of the decorative panel.

19. The sunroof structure according to claim 18, wherein the decorative panel includes a pair of ribs that extends from a first lateral side of the decorative panel to a second lateral side of the decorative panel, with the decorative cutout being defined between the pair of ribs.

* * * * *